United States Patent
Hintz

(10) Patent No.: US 7,907,132 B1
(45) Date of Patent: Mar. 15, 2011

(54) EGOCENTRIC DISPLAY

(75) Inventor: Kenneth J. Hintz, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 752 days.

(21) Appl. No.: 11/748,583

(22) Filed: May 15, 2007

Related U.S. Application Data

(60) Provisional application No. 60/747,346, filed on May 16, 2006.

(51) Int. Cl.
*G09G 5/00* (2006.01)

(52) U.S. Cl. .............. 345/204; 345/7; 434/29

(58) Field of Classification Search ......... 348/169–172; 434/29–54; 345/204, 7–8; 244/1 R
See application file for complete search history.

(56) References Cited

U.S. PATENT DOCUMENTS

| | | | | |
|---|---|---|---|---|
| 4,977,401 A | * | 12/1990 | Sjoberg | 340/975 |
| 5,015,188 A | * | 5/1991 | Pellosie et al. | 434/38 |
| 5,179,377 A | * | 1/1993 | Hancock | 340/961 |

* cited by examiner

*Primary Examiner* — Stephen G Sherman
(74) *Attorney, Agent, or Firm* — David G. Grossman

(57) ABSTRACT

An egocentric display that corresponds to a multidimensional frame of reference. The multidimensional frame of reference may include an ego center, a nadir below the ego center, and a zenith above the ego center. The egocentric display includes a center point, an inner concentric circle and an outer concentric circle. The center point represents the nadir. The inner concentric circle is centered about the center point and represents a horizon plane that is perpendicular to a zenith-nadir line that passes through the zenith, the ego center, and the nadir. The outer concentric circle that represents the zenith should have a radius larger that the inner concentric circle and should also be centered about the center point.

23 Claims, 14 Drawing Sheets

EGOCENTRIC DISPLAY

CROSS-REFERENCE TO RELATED APPLICATIONS

This application claims the benefit of U.S. Provisional Application No. 60/747,346, filed May 16, 2006, entitled "TWO-DIMENSIONAL EGOCENTRIC VOLUMETRIC AND SPHERICAL DISPLAY," which is hereby incorporated by reference in its entirety.

STATEMENT REGARDING FEDERALLY SPONSORED RESEARCH OR DEVELOPMENT

This invention was made with government support under contract No. 01-C-8204 awarded by United States Government to Lockheed Martin Corporation. The government has certain rights in the invention.

DETAILED DESCRIPTION OF EMBODIMENTS

Embodiments of the present invention are displays configured to present characteristics of areas located around an ego center. Embodiments of the present invention may be useful to a pilot flying aircraft by presenting information about other objects flying in the areas surrounding the aircraft. The information presented may include data such as the location of each object, the speed of each object, and the direction of each object. The objects could include such things as other aircraft flying as a squadron, random objects or hostile targets. Other uses for embodiments could be used to present medical imaging information around a point of interest such as a cancerous tumor. Yet another use for embodiments of the invention could be to represent properties related to virtual spaces such as within a database or network.

Figure 1:
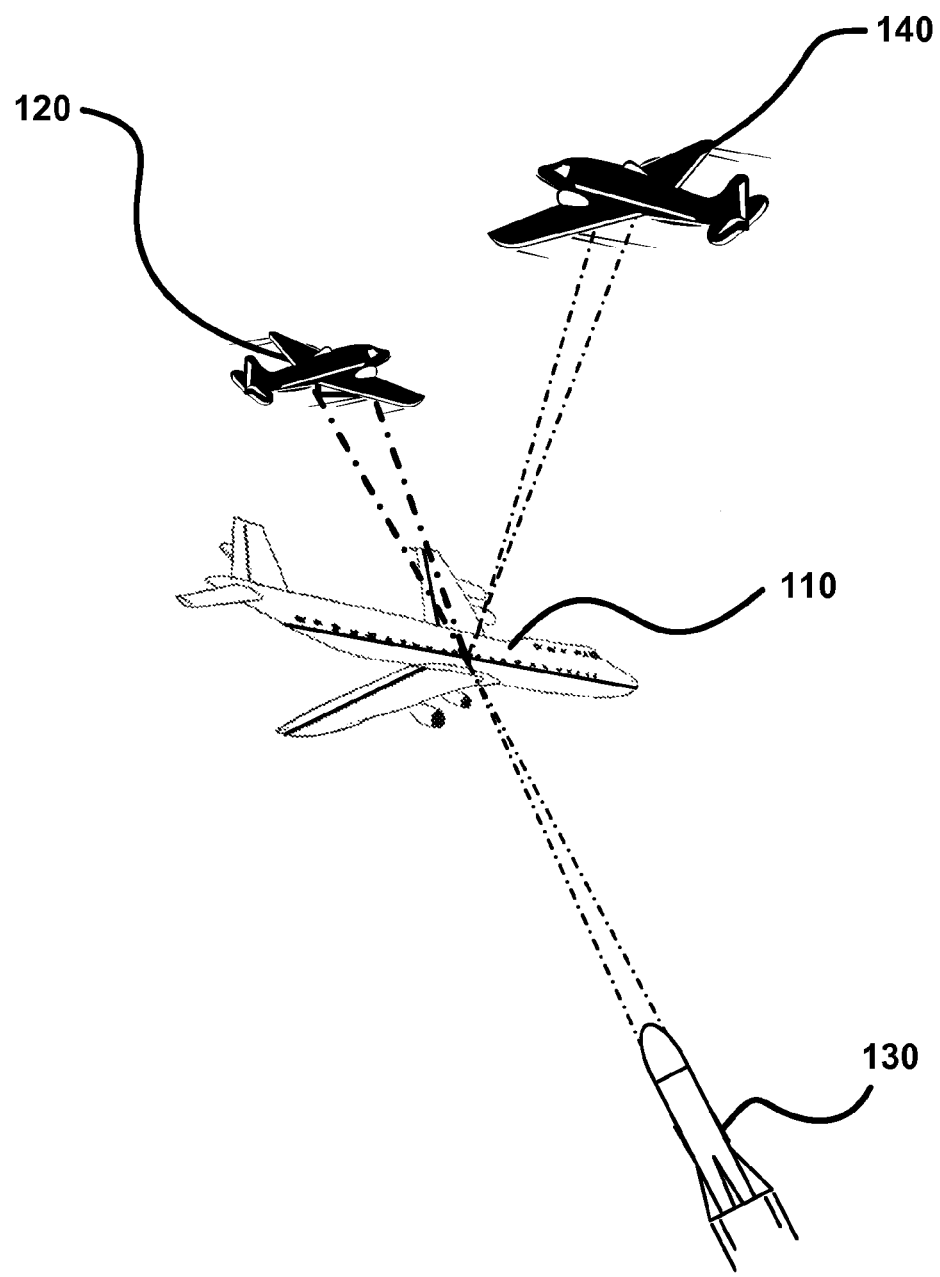
FIG. 1 shows an example of an aircraft imaging several objects in the surrounding airspace.

FIG. 1 shows an illustrative example of airplane 110 imaging objects 120, 130 and 140 in the surrounding airspace. In this example, the imaging may be done using a device such as an on-board radar system. Aircraft 120 and another aircraft 140 are both above the horizon in front of the airplane 110. Also shown in FIG. 1 is a missile 130 in front and below the horizon of aircraft 110. Information about these objects (120, 130 and 140) will later be displayed as part of data points (320, 330 and 340) in figures to follow. Knowing information such as the relative direction of the objects (120, 130 and 140), the rate of change of the distance of the objects (120, 130 and 140) relative to the aircraft 110 and the distance of these objects (120, 130 and 140) relative to airplane 110 may help the pilot determine possible threats to aircraft 110 and then navigate airplane 110 safely around these objects (120, 130 and 140) and avoid a possible collision or engagement by an adversary.

Figure 2:
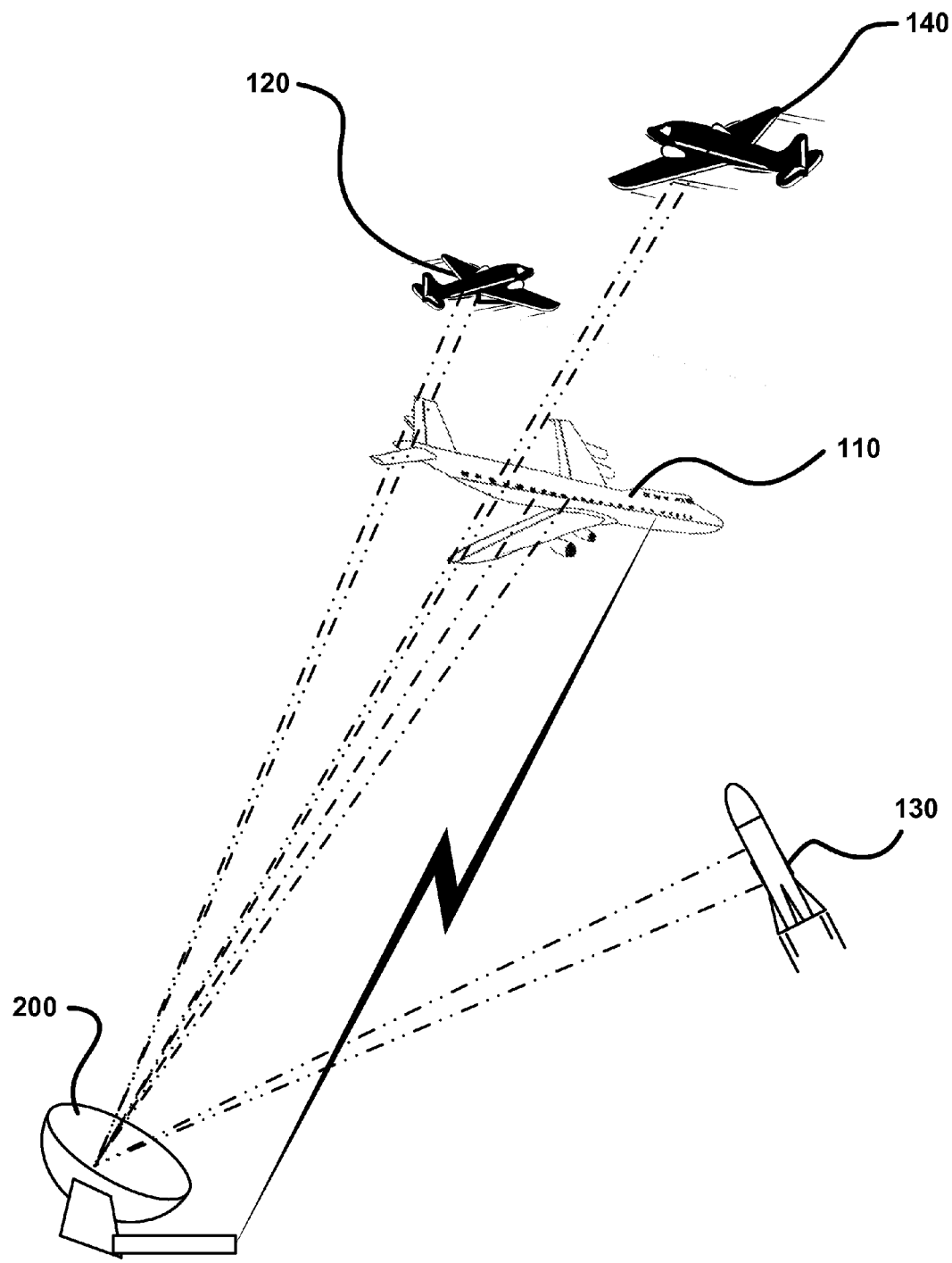
FIG. 2 shows an example of an aircraft receiving imaging information of several objects in the surrounding airspace.

FIG. 2 shows an off-board sensor 200 tracking the position of airplane 110, aircrafts 120 and 140, and missile 130. As shown, sensor 200 is a radar, however many different types of sensors may be used including but not limited to aircraft transponders, satellite remote sensors, and electro-optical sensors. Sensors such as sensor 200 may relay information about the objects (120, 130 and 140) as well as the airplane 110 to airplane 110. The information may include position information. The position information may be relative position information, absolute position information or a combination thereof.

Sensor 200 is shown as a stationary sensor located on the ground. However, sensor 200 could be located on a dynamic platform. Dynamic platforms could include platforms such as satellites, other aircraft, and boats. Alternatively, a multitude of sensors could provide information for presentation on one or more displays or the information from multiple sensors could be fused for presentation on one or more displays.

Embodiments of the invention provide for displaying multi-dimensional data relative to an ego on an egocentric display. An ego is a central position from which everything else is referenced. In the illustrated example, airplane 110 is located at the ego and the multi-dimensional data includes information about objects 120, 130 and 140.

Figure 3:
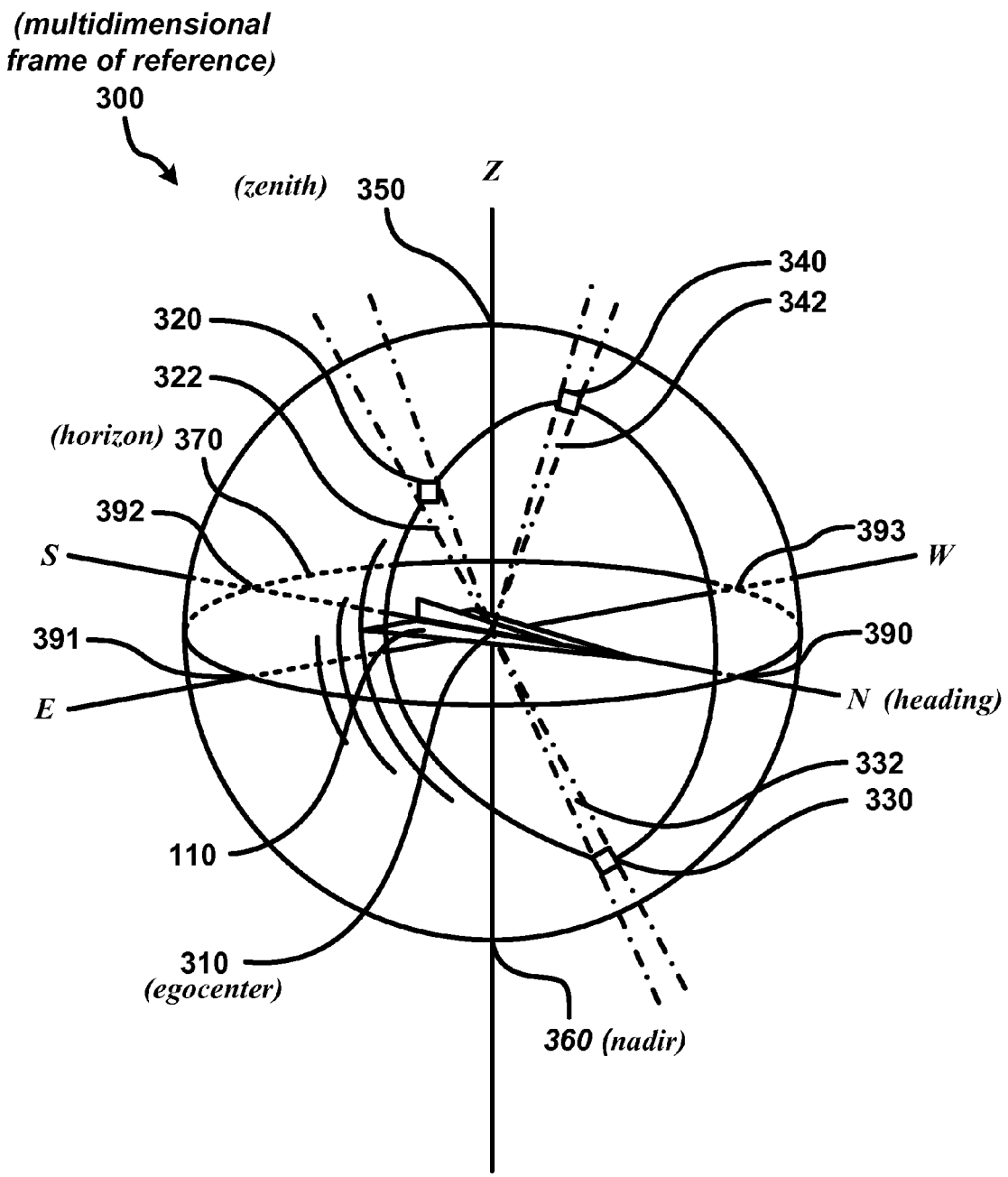
FIG. 3 illustrates a multidimensional egocentric frame of reference as per an aspect of an embodiment of the invention.

FIG. 3 shows a three-dimensional egocentric frame of reference 300 for mapping objects 120, 130, and 140 relative to the airplane 110. The figure shows an airplane 110 at an ego center 310 with a nadir 360 directly below the ego center 310, a zenith 350 directly above the ego center 310, and a horizon 330 circling the ego center 310. As illustrated, the heading is pointing due north, however, the heading can be set to any direction including being slaved to the aircraft 110. Alternatively, the heading may label the aircraft 110 heading as a relative "north" North may not always align with the earth's magnetic or true north.

The figure also shows beams: 322, 332 and 342; and data points 320, 330, and 340. Beam 342 is aimed in the direction of object 140 and starts at the ego 310 and extends out above the horizon 330 in a northwesterly direction relative to the ego 310. Data point 340 may represent information associated with beam 342. The data associated with point 340 may be a function of all information collected in beam 342 or just selected information. When the data point 340 only presents selected data, the information may be selected using any number of criteria. For example, the criteria could select only the largest object in the beam, only the closest object in the beam, all of the objects in the beam, or some of the objects in the beam. The length of a beam such as 342 may be limited by the ability to collect information about the beam. In particular, when using an on-board radar, there may be a practical scan range that limits the distance in which the sensor can effectively process returned data. Aircraft 140, being in the path of beam 342, may be covered by data point 340. Thus, the data could include information such as aircraft 140's distance from the ego 310, the speed of aircraft 140, the classification of aircraft 140, or the size or radar cross section of aircraft 140. Data point 340 may also display other information relating to information in beam 342 such as atmospheric density, weather, number of objects, etc.

Beam 322 is aimed at object 120. Data point 320 can represent data above the horizon 330 and located in a northeasterly position relative to ego 310. Data point 320 may represent information associated with beam 322. Aircraft 120, being in the path of beam 322, may be covered by data point 320. Thus, the data could include information such as aircraft 120's distance from the ego 310, the speed of aircraft 120, or the size of aircraft 120.

Beam 332 is aimed at object 130. Data point 330 can represent data located below horizon 330 and in a northeasterly direction relative to ego 310. In this instance, missile 130 is located in beam 332 and may be covered by data point 330. Thus, the data could include information such as missile 130's distance from the ego 310, the speed of missile 130, or the size of missile 130.

Figure 4:
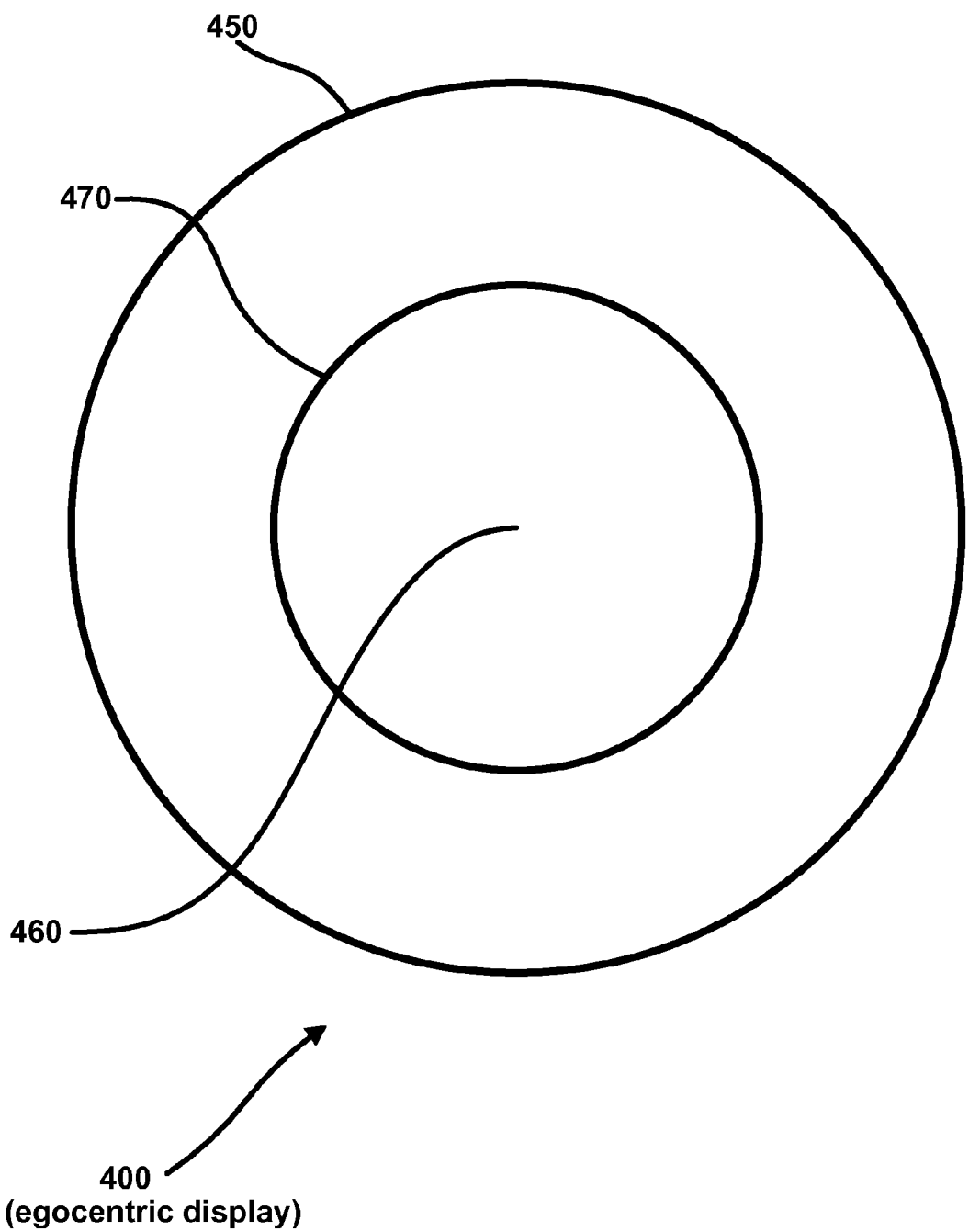
FIG. 4 shows an egocentric display according to an aspect of an embodiment of the invention.

FIG. 4 shows a basic embodiment of an egocentric display 400 without any data. The display 400 consists of a center point 460 surrounded by two concentric circles 470 and 450. The center point 460 represents nadir 360 directly below the ego 310. The inner circle 470 represents horizon 370 relative to the ego 310. The outer circle 450 represent zenith 350 directly above the ego 310.

Figure 5:
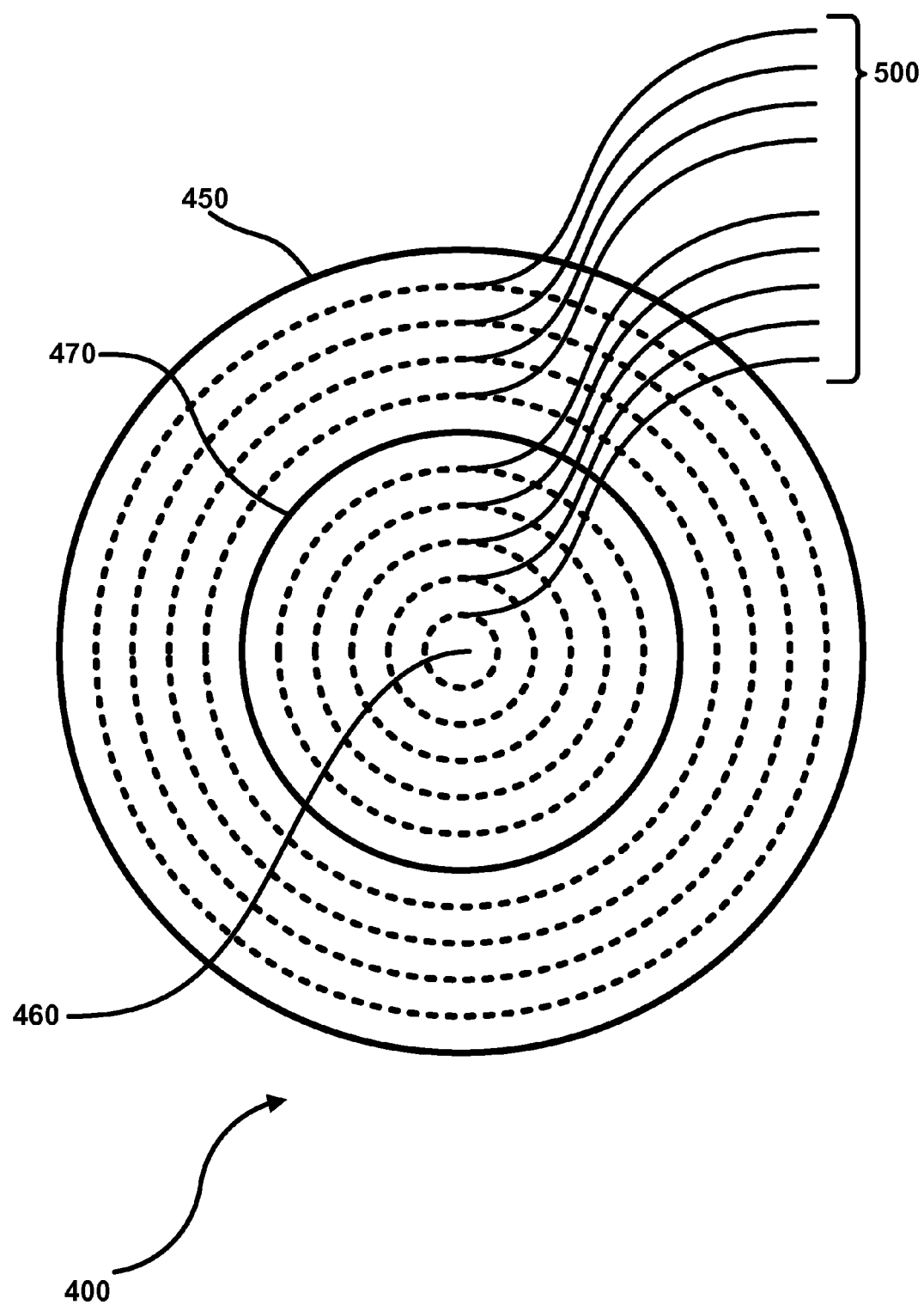
FIG. 5 shows an egocentric display with additional reference circles according to an aspect of an embodiment of the invention.

FIG. 5 shows an alternative embodiment of egocentric display 400 containing additional concentric circles 500. These additional concentric circles 500 can represent additional angular elevations between the nadir 460 and the zenith 450. The additional concentric circles 500 may have characteristics to aid in distinguishing among them. For example, some of the additional concentric circles 500 may be of different widths, colors, and line types (or combinations thereof) than the horizon circle 470, zenith circle 450, and/or each other 500.

Figure 6:
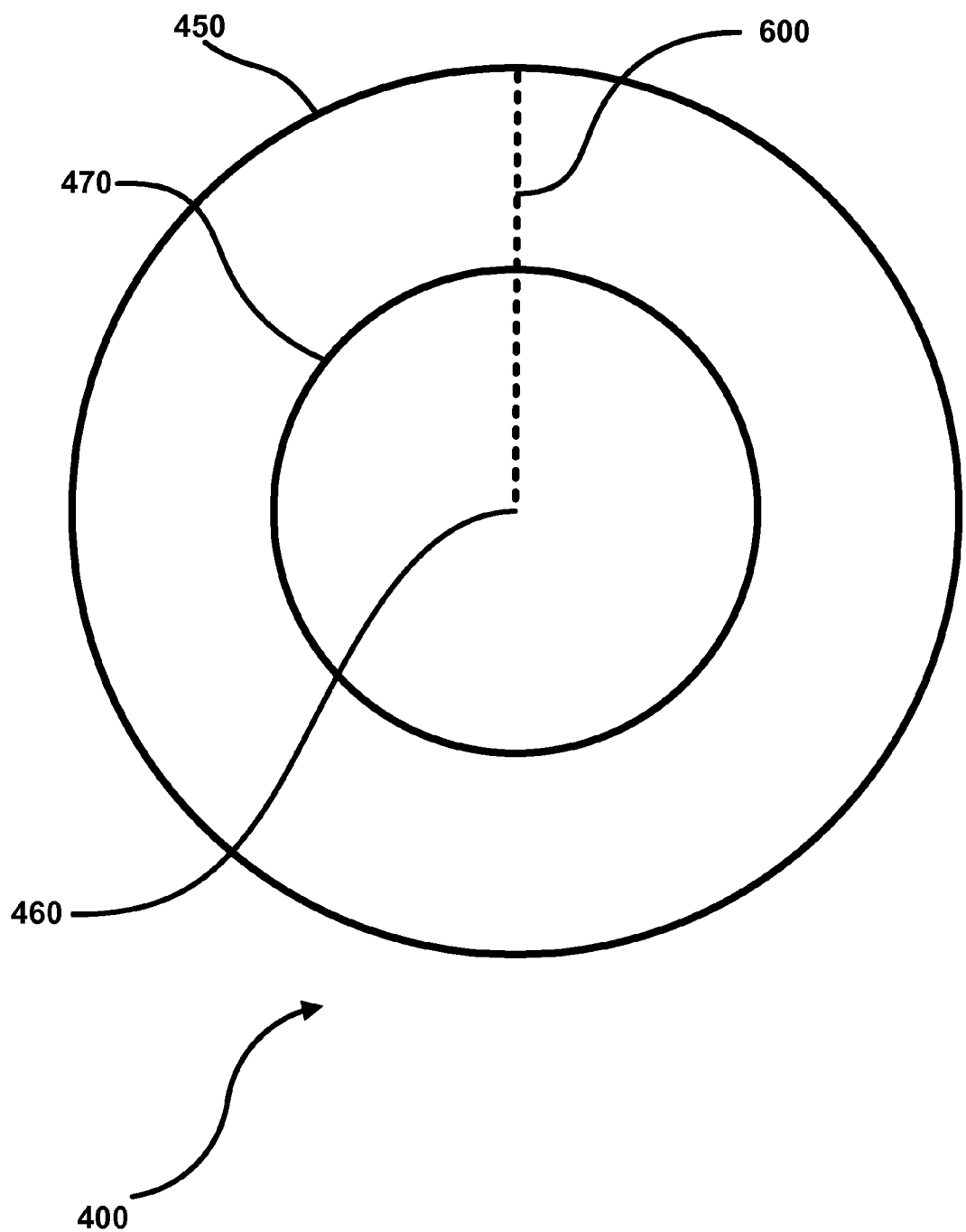
FIG. 6 shows an egocentric display with a reference line as per an aspect of an embodiment of the invention.

FIG. 6 shows an alternative embodiment of egocentric display 500 containing a reference line 600. As illustrated, this reference line 600 begins at nadir point 460 on the display 400 and extends to the zenith circle 450.

The reference line 600 could represent an absolute direction such as geostationary earth magnetic or true north. Alternatively, the reference line 600 could represent a relative direction such as the heading of the ego center 310. For example, the reference line 600 could be slaved to the attitude (roll, pitch, and yaw angles) of an aircraft or sensor platform. In this embodiment, a pilot could use the display 400 to determine the direction of the data being represented relative to the aircraft 110 attitude. This maybe referred to as the attitude stabilized mode of operation. The roll, pitch, and yaw of the aircraft may affect the location of the data points on the display 400 as the direction of these values change. In this context, the roll means the angle about the longitudinal axis of the aircraft. The pitch angle means the angle which the longitudinal axis makes with the horizon or local tangent plane to the earth. The yaw angle indicates how far an aircraft is pointing away from its direction of travel due to rotation about its vertical axis.

In another embodiment, the reference line 600 may be slaved to the heading of a moving object independent of roll and pitch. This may be referred to as the heading stabilized mode of operation. In this mode, the egocentric display may display data which occurs in directions relative to the moving ego.

Figure 7:
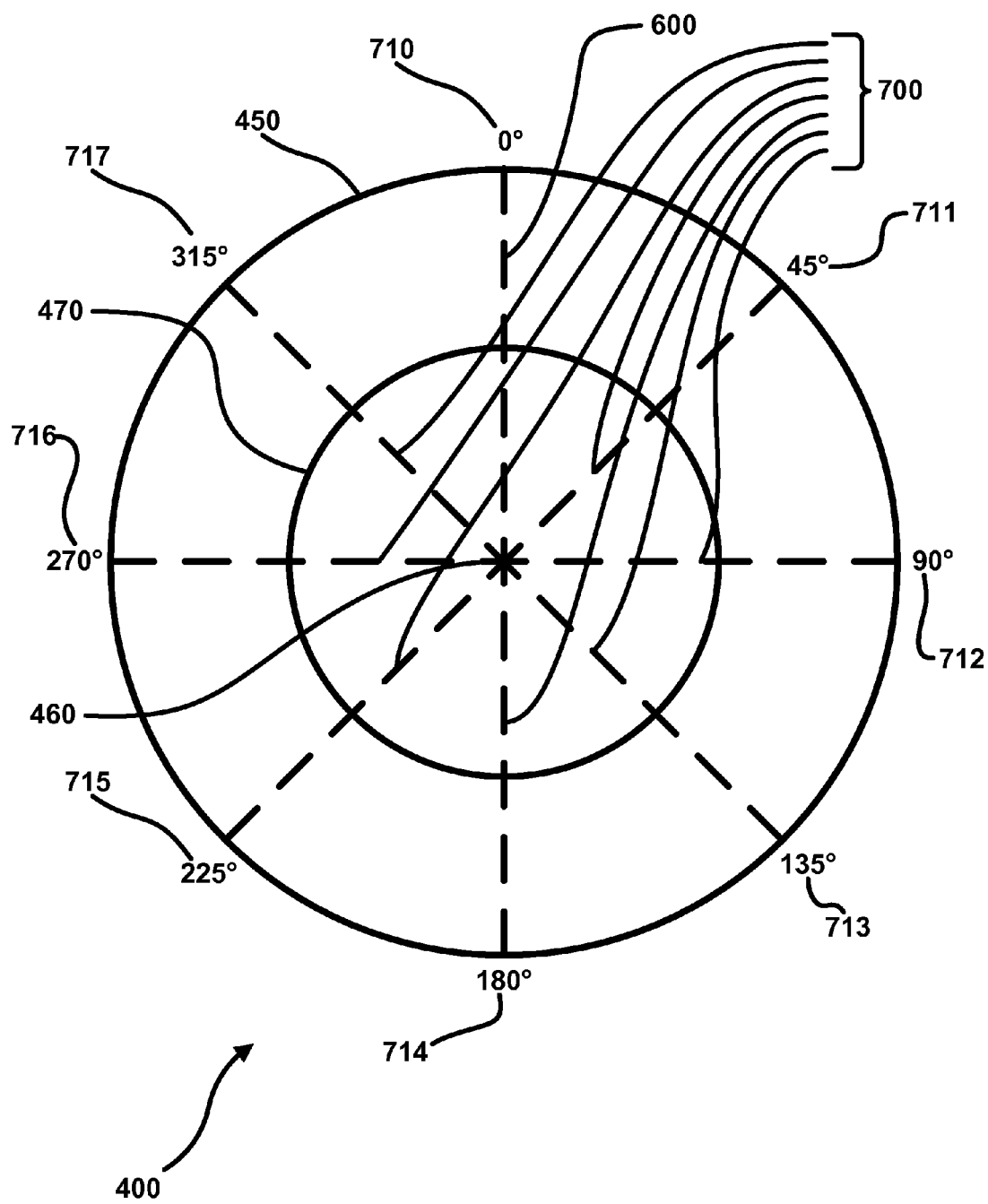
FIG. 7 shows an egocentric display with multiple fiducial line segments as per an aspect of an embodiment of the invention.

FIG. 7 shows an alternative embodiment of egocentric display 400 containing multiple fiducial line segments 700. The use of fiducial line segments 700 may be labeled to suit the needs of the display user. The multiple fiducial line segments 700 could represent values on an angular scale such as angles or compass directions. This embodiment shows reference indicia (710, 711, 712, 713, 714, 715, 716, and 717) placed around the perimeter of the display 400 in association with the multiple reference lines 700. However, reference indicia (710, 711, 712, 713, 714, 715, 716, and 717) may be used in embodiments with or without reference lines 700. The reference indicia (710, 711, 712, 713, 714, 715, 716, and 717) here represents degrees around the ego center 310, however, other indicia could also be used such as compass directions around the ego center 310. Other embodiments may have direction lines 700 of various lengths. For example, a fiducial line segment 700 may extend past the zenith circle 450 or be a length that is short of reaching either the nadir point 460, the zenith circle, or both.

Figure 8:
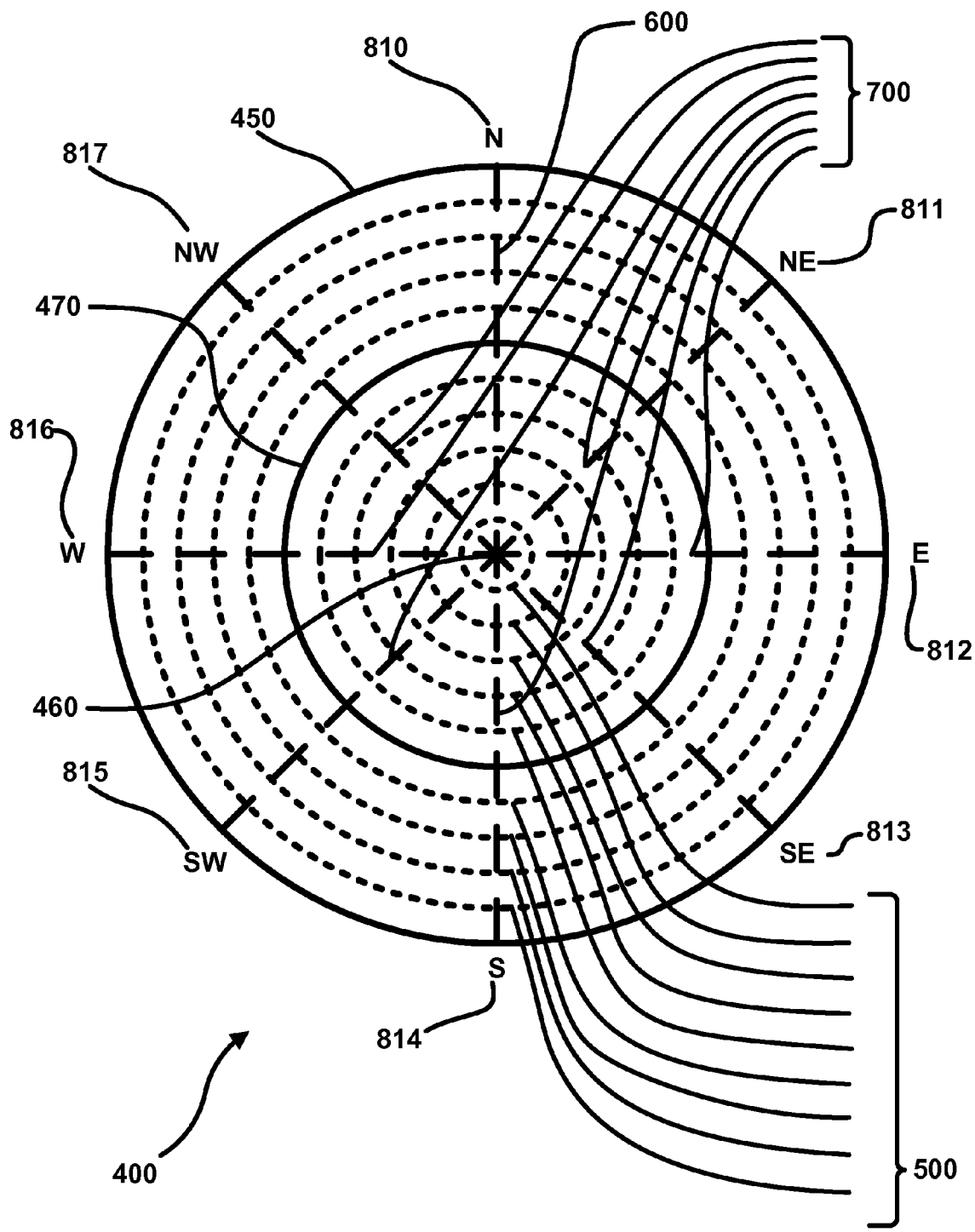
FIG. 8 shows an egocentric display with multiple fiducial line segments and additional reference circles as per an aspect of an embodiment of the invention.

FIG. 8 shows an alternative embodiment of egocentric display 500 containing multiple fiducial line segments 700 in combination with the additional concentric circles 500. The use of fiducial line segments 700 and circles 500 may be configured (and/or labeled) to suit the needs of the display user. This embodiment also shows reference indicia (810, 811, 812, 813, 814, 815, 816, and 817) placed around the perimeter of the display 500 in association with the fiducial line segments 700. The reference indicia (810, 811, 812, 813, 814, 815, 816, and 817) here represents compass directions around the ego center 310.

Figure 9:
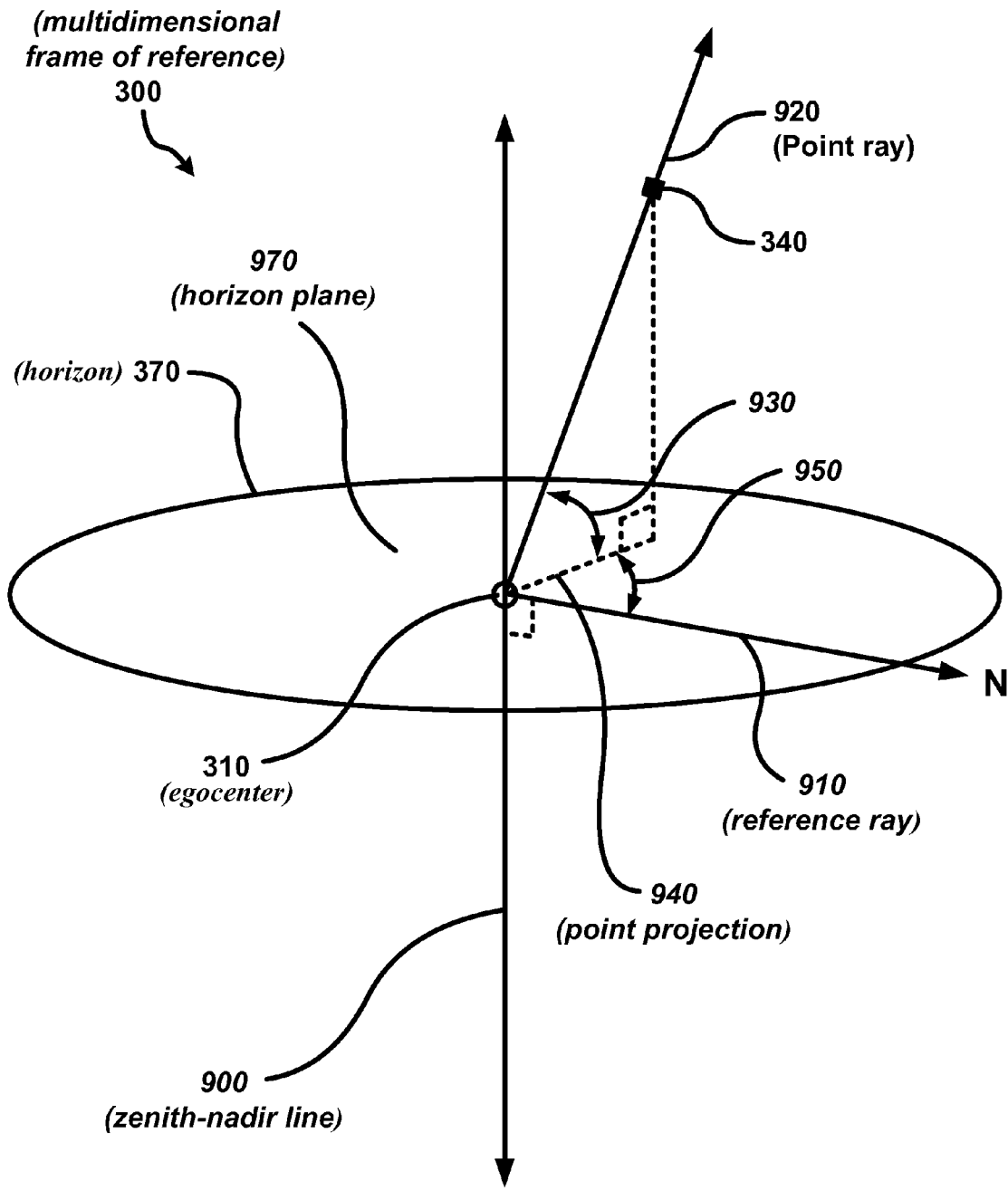
FIG. 9 shows the transformation geometry in a multidimensional frame of reference as per an aspect of an embodiment of the invention.
Figure 10:
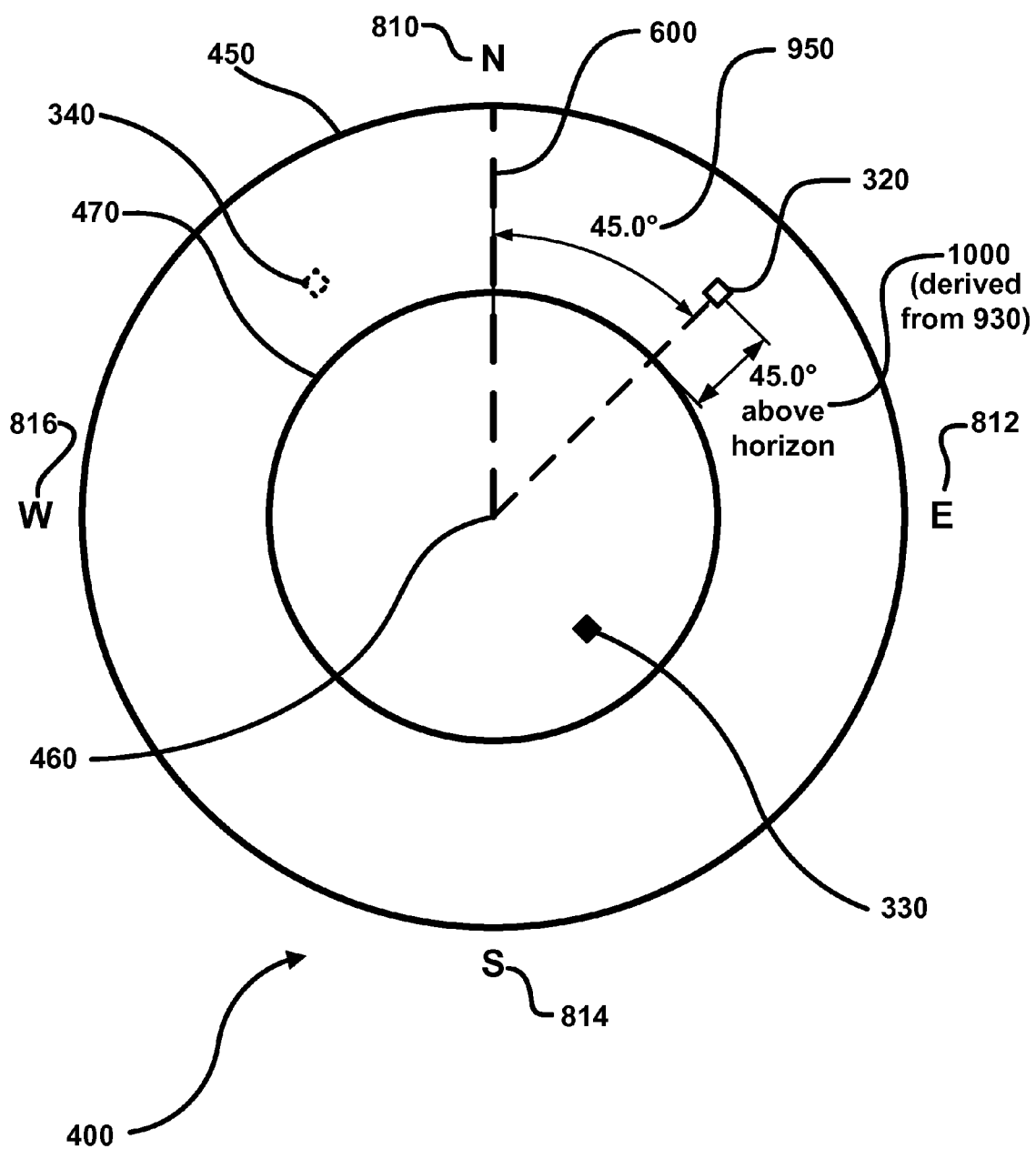
FIG. 10 shows the transformation geometry on an egocentric display as per an aspect of an embodiment of the invention.

FIG. 9 and FIG. 10 shows the transformation geometry between the multidimensional frame of reference 300 and egocentric display 400. Specifically, FIG. 9 shows the transformation geometry in the multidimensional frame of reference 300 and FIG. 10 shows the transformation geometry on the egocentric display 400. A zenith-nadir line 900 runs through the zenith 350 (not shown), the ego center 310 and the nadir 360 (not shown). A point ray 920 starts at the ego center 310 and extends through the point 340. A reference ray 910 starts at the ego center 310 and extends in a horizon plane, the horizon plane 970 that is perpendicular to the zenith-nadir line 900. A point projection 940 may be generated by projecting the point ray 920 onto the horizon plane 970. A first angle 950 may be measured from the reference ray 910 to the point projection 940. A second angle may be measured from the point projection 940 to the point ray 920. A plotting position may be determined on the egocentric graph 400 by: (1) starting at the reference line 600 and traveling around the inner concentric circle by a distance specified by the first angle 950; and (2) traveling from the inner concentric circle 470 a distance 1000 functionally related to the second angle 930, wherein an embodiment of functionally related may to compute the distance to be proportional to the second angle 930.

Figure 11:
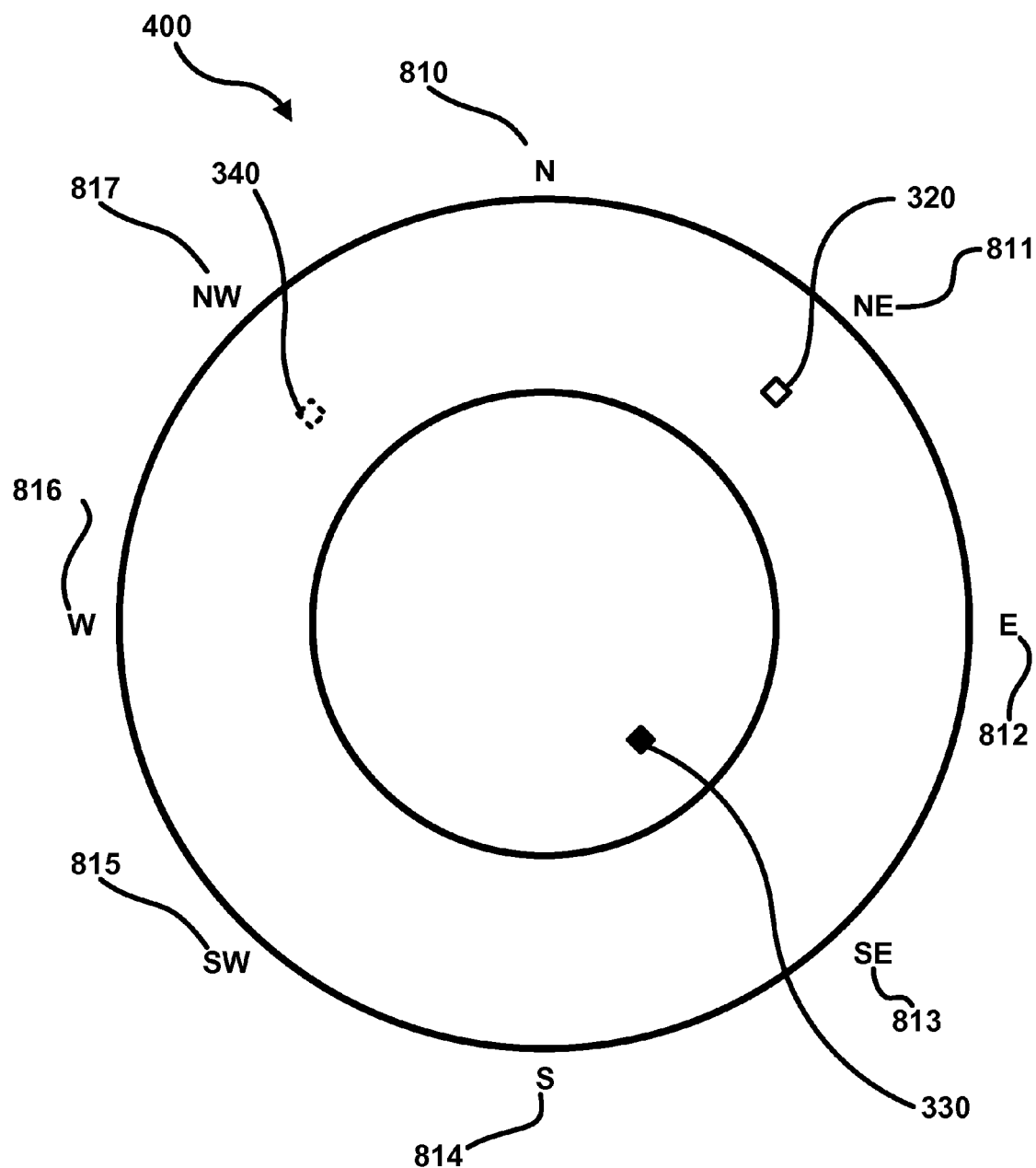
FIG. 11 shows data points mapped onto an embodiment of an egocentric display as per an aspect of an embodiment of the invention.

FIG. 11 shows data points 320, 330 and 340 mapped onto an embodiment of egocentric display 400. Each of the data points (320, 330 and 340) may represent data corresponding to information found in a beam that originates at ego 310 and travels in the direction of the plotted data point (320, 330 and 340 respectively). In the context of aircraft, the information may include the direction of other aircraft relative to the ego. The information may be a probability of an occurrence in a direction from the ego center 310. For example, the information may include the probability that an aircraft will be located in a certain direction at a specified time. In another embodiment, the property may be a density of an object in a direction from the ego center 310 at the center of the object. This illustrated embodiment includes compass direction reference indicia (810, 811, 812, 813, 814, 815, 816, and 817). In this example, the ego center 310 has a heading slaved to north 810.

The display in FIG. 10 and FIG. 11 show that data points 320, 330, and 340 may be given distinctive characteristics to present information related to the data point (320, 330, and 340). As shown, data point 320 is white, data point 330 is black and data point 340 is neither white nor black. In this example, the information being presented to a user relates to the direction an object is traveling, with black meaning that there is an object traveling directly towards the ego 310, white means there is an object traveling directly away from the ego 310 and intermediate intensities between black and white can indicate a proportional angle between directly towards and directly away. Looking at this screen, a pilot could tell that an object associated with data point 320 (white) is moving away from aircraft 110, data point 330 (black) is moving towards aircraft 110 and the object associated with data point 340 is neither heading directly towards nor directly away from aircraft 110.

Figure 12:
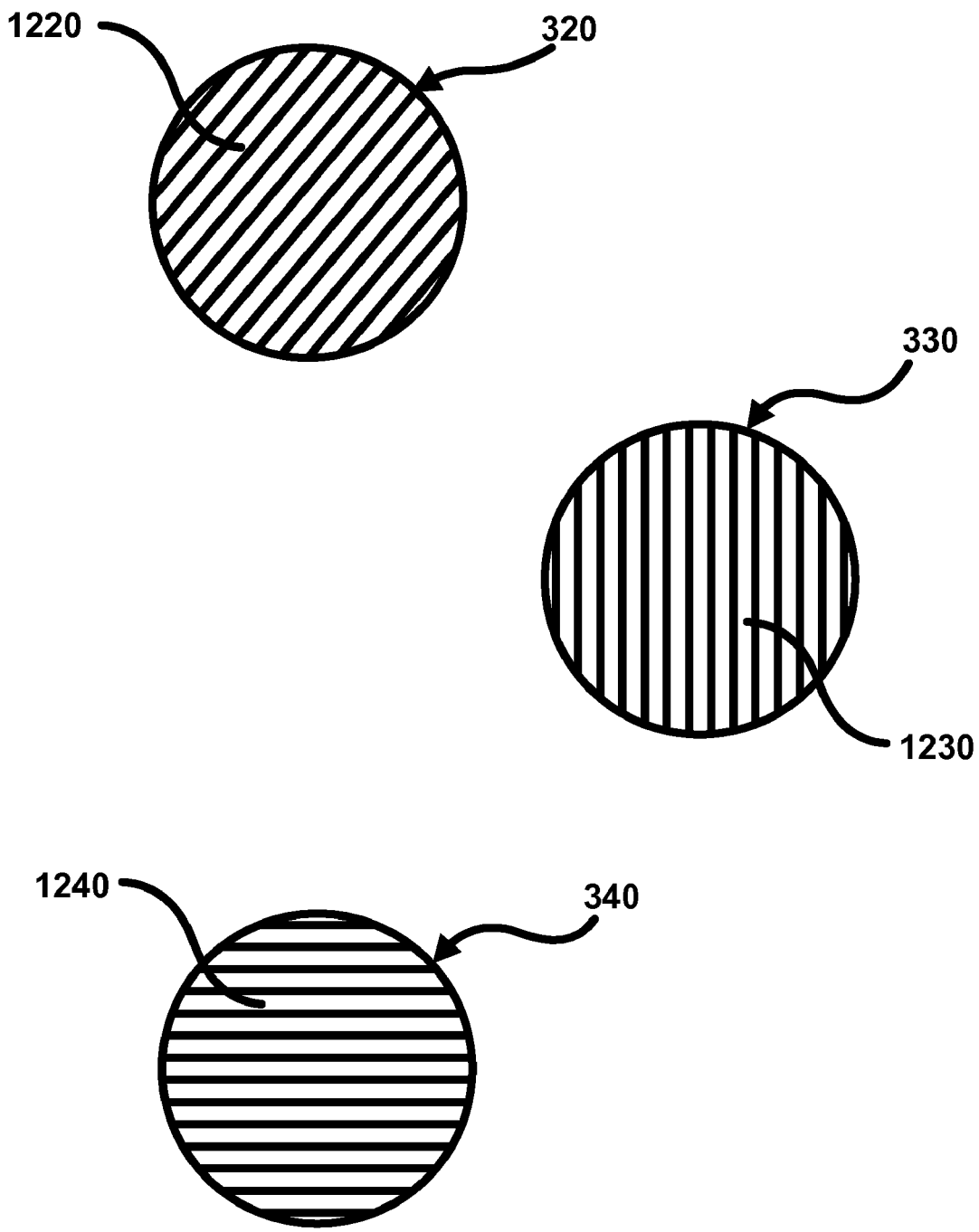
FIG. 12 shows possible representations of data as per an aspect of an embodiment of the invention.

These data points are further represented in FIG. 12 to show one of the possibilities for displaying the data. Referring to FIG. 12, the diagonal hatched points 1220 can represent a value of the data in a direction from the ego while vertical hatching 1230 or horizontal hatching 1240 could represent other values.

As described, information collected in the region of a point ray may be transformed into a value selected from a set of values for representation. For example, in one embodiment of the invention, different colors can represent the different types or values of data. A lower intensity color may represent a lower value for the data with less intense colors representing higher values. The converse is also possible. In another embodiment, the data values can be represented by dots of different sizes. A smaller diameter dot can represent a smaller value in the data, with larger diameter dots representing larger values in the data. Another embodiment has the data represented by a human readable number. Higher numbers can represent higher data values with lower numbers representing lower data values. In another embodiment, the data may be represented by hatching or shading. One type of shading may represent a low data value with different shading representing higher data values. Any combination of these embodiments may also be possible to display the values of the data.

The data points may be displayed closely together or farther apart depending on the use of the display. With an embodiment using colors to display the data, the data points may be displayed continuously so as to fill the entire display with data points. In this case, the spatial extent of the data on the display may not be directly related to its actual size in space. The angular location accuracy can be preserved at the expense of area fidelity. In an embodiment representing values with numbers, the data points may be spaced farther apart so as to easily read the numbers.

Figure 13:
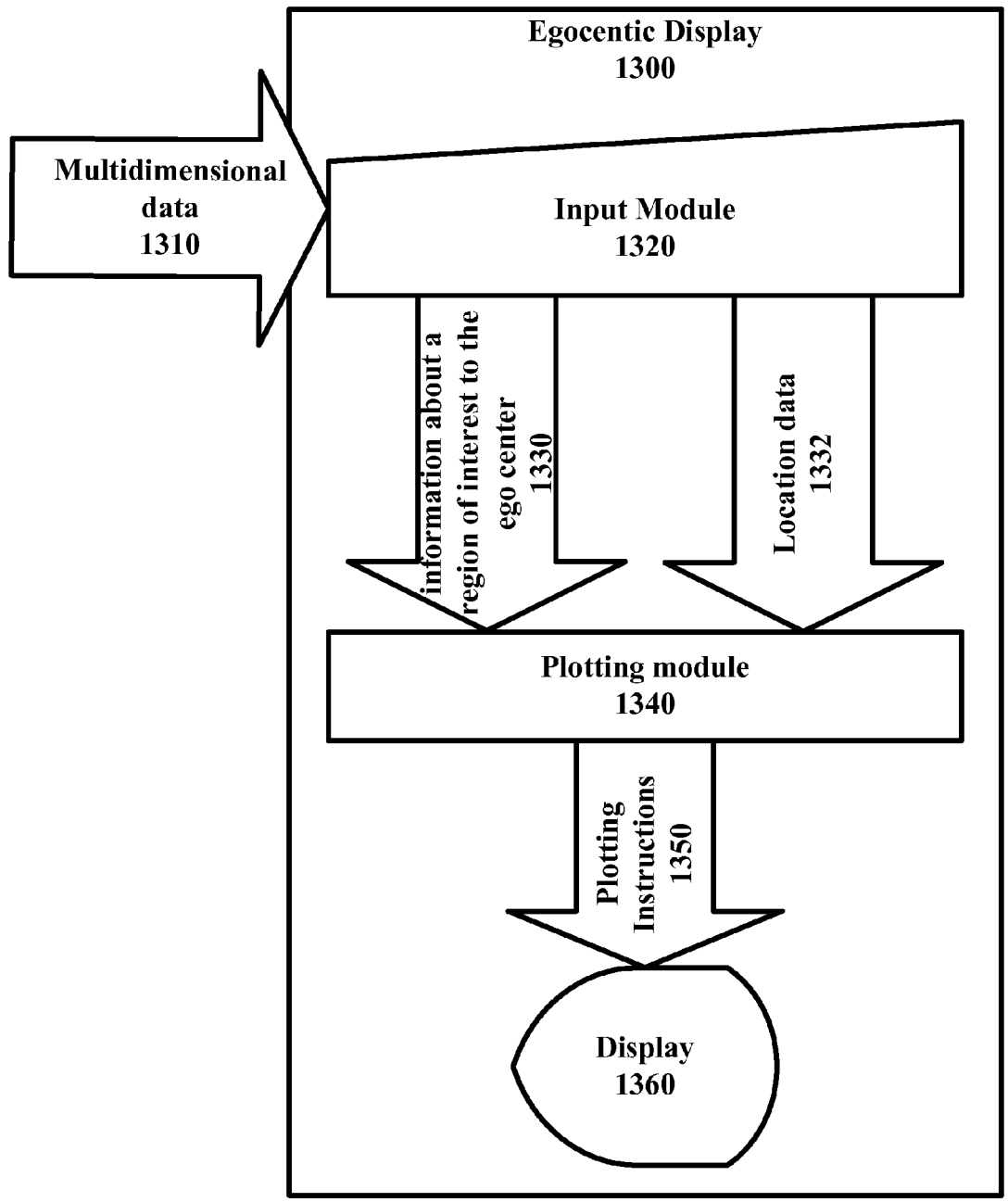
FIG. 13 is a block diagram of an egocentric display system as per an aspect of an embodiment of the invention.

FIG. 13 shows a block diagram of an embodiment of an egocentric display 1300. Multi-dimensional data 1310 may be received into the egocentric display 1300 through an input module 1320. The multidimensional data 1320 may include information 1330 about a region of interest to the ego center 310. For example, the information 1330 may include probability data of finding an object in a region that follows a ray emanating from the ego center 310. For mapping purposes, it may be useful for the multidimensional data 1320 to also include location data 1332 that is associated with the information 1330.

The input module 1310 may then pass the information 1330 and location data 1332 to a plotting module. The plotting module is preferably configured to pass plotting instructions 1350 to display 1360. The plotting instructions 1350 should enable a representation of the information 1330 to be plotted on a display 1360 at a plotting location determined using associated location data 1332. The location data 1332 may relate to a physical frame of reference such as that shown in FIG. 3. In this case, the location data 1332 may need to be transform regions of interest to an ego center 310 so that it relates to the egocentric display 300. An example of such a transformation was illustrated and discussed with respect to FIG. 9 and FIG. 10.

It needs to be pointed out that the frame of reference shown in FIG. 3 illustrates one way to locate regions of interest to an ego center 310 in a three dimensional physical frame of reference. The location of region in three dimensional space may be identified using a coordinate systems such as a polar coordinate or a Cartesian coordinate system. Other coordinate systems may also be used. However, locations of regions of interest to the ego center 310 may be represented in many ways other ways, especially when more than three dimensions are in the frame of reference. Additional dimensions may include dimensions such as temporal dimensions, spatial dimensions, virtual dimensions, mathematical describable dimensions, norms in a measure space, or logical dimensions.

The transformation the location data 1332 from one coordinate system for use on an ego center 310 may only need occur before the location data 1332 is plotted. Therefore, it could be that the location data 1332 is to be transformed in other places (or times) such as in the input module 1320 or the plotting module 1340. It could even be that the location data 1332 is transformed before the input module 1320 or by the display 1360.

The multidimensional data 1310 may be gathered from an internal or external source. In one embodiment of the invention, sensors may be placed on an aircraft or other movable platform. A sensor, such as radar, laser, or electro-optical sensor, either on board the aircraft or external, or other device can track signals coming from these sensors and send their position relative to the ego to a receiver.

The term module defines a functional block that may be implemented in many ways including using hardware, firmware, software or any combination thereof. Embodiments that include hardware may use general purpose or specific components including microprocessors, microcontrollers, ASICs or FPGAs.

The information 1330 about a region of interest to the ego center 310 may represent many types of data. In the context of aircraft, the information 1330 may include the direction of other aircraft relative to the ego center 310. The information 1330 may be a probability of an occurrence in a direction from the ego center 310. For example, the information may describe the probability that an aircraft will be located in a certain direction at a specified time. In another embodiment, the information may be a density of an object in a direction from the ego center 310 at the center of the object. For example, if one wanted to drill into the center of an object and wants to know the path of least resistance, he may want to know which part of the object is the least dense. Other examples of information include the distance from the ego center 310 to an object in the region of a point ray, and the number of objects in the region of a point ray.

The display may be projected onto a surface so that it conforms to the shape of the surface. In this embodiment, the display could be either two or three-dimensional depending upon the surface. One embodiment would be to project the egocentric display onto a flat surface to create a two-dimensional display.

In summary, an embodiment of the present invention is an egocentric display 400 that corresponds to a multidimensional frame of reference 300. FIG. 3 illustrates an example of a multidimensional frame of reference 300 that includes an ego center 310, a nadir 360 below the ego center 310, and a zenith 350 above the ego center 310. In general, the ego center 310 can represent a location of interest. The egocentric display 400 includes a center point 460, an inner concentric circle 470 and an outer concentric circle 450. The center point 460 represents nadir 360. The inner concentric circle 470 is centered about the center point 460 and represents a horizon plane that is perpendicular to a zenith-nadir line 900 that passes through the zenith 350, the ego center 310, and the nadir 360. The outer concentric circle 450 should have a radius larger that the inner concentric circle 470 and should also be centered about the center point 460. The outer may represent the zenith 350.

The egocentric display 400 may also include a reference ray 600 that starts at the ego center 310 and extends in the horizon plane 950. The reference ray 600 may represent a direction such as a heading for the ego center 310 or a geostationary direction.

The egocentric display 400 of FIGS. 4 and 1300 of FIG. 13 may also include an input module 1320 that is configured to receive multidimensional data 1310. The multidimensional data 1320 may include information 1330 about a region of interest to the ego center 310 as well as associated location data 1332. The region of interest may be a region in the area of a point ray that starts at the ego center 310 and extending through a point.

The egocentric display 400 or 1300 may also including a plotting module 1340 that is preferably configured to plot a representation of the information 1330 on a display 1360 at a plotting location determined using associated location data 1332.

The egocentric display 400 or 1300 may also include a multitude of fiducial line segments 700 that represent directions emanating from the ego center 310. The geocentric display 400 or 1300 may also include directional indicia that may indicate direction information. The directional indicia include directional identifications such as compass directions (810, 811, 812, 813, 814, 815, 816, & 817) or angular representations (710, 711, 712, 713, 714, 715, 716, & 717). Additionally, the egocentric display 400 or 1300 may include additional concentric circle(s) 500 that represent angular elevation(s) between the nadir 360 and the zenith 350.

The information may include a distance from the ego center. The representation of the information 1330 may include at least one of the following: grid points; intensity; icons; temporal changes; colors; numbers; shading; dots; or any combination of two or more thereof.

The egocentric display 400 may be generated using instructions residing on a computer readable medium. Additionally, the egocentric display 400 may be warped. This may be useful if the display is presented on a non-flat or angled surface.

Some embodiments of the present invention may be practiced as a method. One of the ways of practicing the method is through the use of a series of computer instructions that when executed by one or more processors causes the processor(s) to execute a series of actions related to the method. The series of computer readable instructions may be stored on a tangible computer readable medium such as a hard disc, flash drive or network storage. The method may be used to plot a point locatable in a multidimensional frame of reference on a display. The multidimensional frame of reference can include an ego center, a nadir below the ego center, and a zenith above the ego center.

Figure 14:
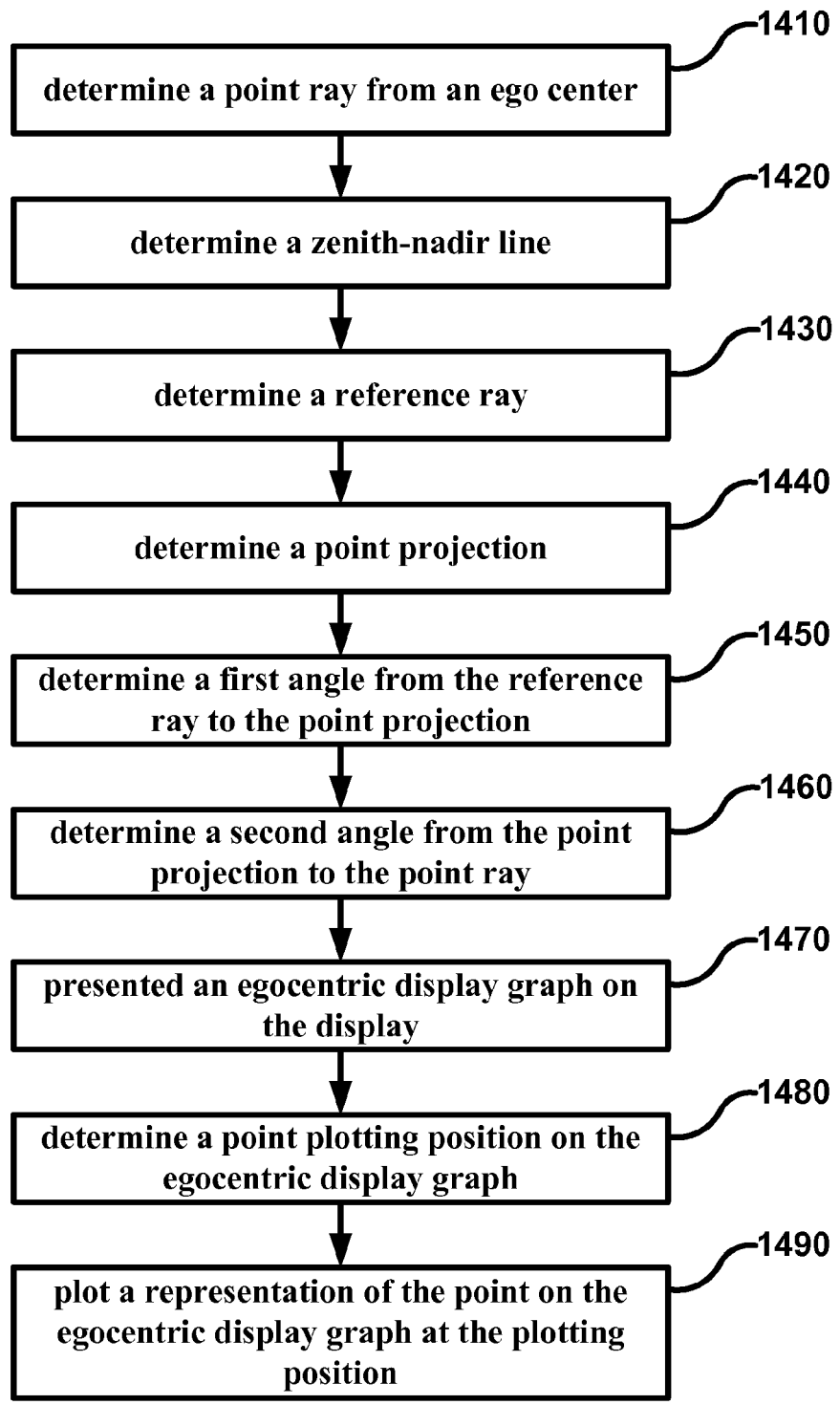
FIG. 14 is a flow diagram of a method as per an aspect of an embodiment of the invention.

FIG. 14 is a flow diagram that illustrates a set of actions that may be used to practice an embodiment of the invention. One of the actions 1410 includes determining a point ray that starts at the ego center and extends through the point. At 1420 a zenith-nadir line that passes through the zenith, the ego center, and the nadir may be determined. A reference ray that starts at the ego center and extends in a horizon plane may be determined at 1430. The horizon plane should be perpendicular to the zenith-nadir line. At 1440, a point projection may be determined. Preferably, the point projection is a projection of the point ray onto the horizon plane. A first angle may be determined from the reference ray to the point projection at 1450. A second angle may be determined from the point projection to the point ray 1460. An egocentric graph may be presented on the display at 1470. The egocentric graph may include: a center point, an inner concentric circle and an outer concentric circle. The center point may represent the nadir. The inner concentric circle should be centered about the center point and may represent the horizon plane. The outer concentric circle may represent the zenith and should be centered about the center point and have a radius larger that the first concentric circle.

A plotting position may be determined for the point on the egocentric graph at 1480. To do this, start at the reference ray and travel around the inner concentric circle by a distance specified by the first angle and traveling from the first concentric circle a distance proportional to the second angle. At 1490, plot the point on the egocentric graph at the plotting position.

Points may be represented by one or more values as described earlier. Values may describe information collected in the region of the point ray. For example, the value may represent a distance from the ego to an object in the region of the point ray. So, instead of plotting the point directly, one could plot a representation of the value on the egocentric graph at the plotting position. The value representation could be presented in many ways such as: grid points; intensity; icons; temporal changes; colors; numbers; shading; dots; or any combination of two or more thereof.

While various embodiments have been described above, it should be understood that they have been presented by way of example, and not limitation. It will be apparent to persons skilled in the relevant art(s) that various changes in form and detail can be made therein without departing from the spirit and scope of the invention. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on example(s) where an aircraft located at the ego center represents a location of interest. However, one skilled in the art will recognize that embodiments of the invention could be used where the ego center represents other locations of interest. For example, the location of interest could be a record in a database, a location on a genetic string, a point in time, a location in a multidimensional value space, a location of interest with respect to a medical image, or a location in a virtual world. Another example of equivalent variations of embodiments includes changing the relative position of locations such as the zenith and nadir. So for example, an alternative embodiment to those described above could include the outer concentric circle representing a nadir and the center point representing a zenith. It should also be noted that multidimensional space is not limited to the 3 dimensional Cartesian physical space.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An egocentric display that corresponds to a multidimensional frame of reference, the multidimensional frame of reference including: an ego center, a nadir representing the maximum angular elevation from a horizon plane to below the ego center, and a zenith representing the maximum angular elevation from the horizon plane to above the ego center, the egocentric display comprising:
    a) a center point, the center point representing the nadir;
    b) an inner concentric circle centered about the center point, the inner concentric circle representing the horizon plane, the horizon plane being perpendicular to a zenith-nadir line, the zenith-nadir line passing through the zenith, the ego center, and the nadir; and
    c) an outer concentric circle centered about the center point, the outer concentric circle having a radius larger that the inner concentric circle, the outer concentric circle representing the zenith.

2. An egocentric display according to claim 1, further including a reference ray, the reference ray starting at the ego center and extending in the horizon plane.

3. An egocentric display according to claim 2, wherein the reference ray represents a heading for the ego center.

4. An egocentric display according to claim 2, wherein the reference ray represents a geostationary direction.

5. An egocentric display according to claim 1, further including an input module configured to receive multidimensional data, the multidimensional data including information about a region of interest to the ego center and associated location data.

6. An egocentric display according to claim 5, wherein the information is collected in the region of a point ray, the point ray starting at the ego center and extending through a point.

7. An egocentric display according to claim 5, wherein the information includes a distance from the ego center.

8. An egocentric display according to claim 1, further including a plotting module configured to plot a representation of the information on a display at a plotting location determined using associated location data, the information and location data being part of multidimensional data that includes information about a volume surrounding the ego center.

9. An egocentric display according to claim 8, wherein the representation of information includes at least one of the following:
    a) grid points;
    b) intensity;
    c) icons;
    d) temporal changes;
    e) colors;
    f) numbers;
    g) shading;
    h) dots; or
    i) any combination of two or more thereof.

10. An egocentric display according to claim 1, further including a multitude of fiducial line segments, the fiducial line segments representing directions emanating from the ego center.

11. An egocentric display according to claim 1, further including directional indicia, the directional indicia indicating direction information.

12. An egocentric display according to claim 11, wherein the directional indicia includes compass directions.

13. An egocentric display according to claim 11, wherein the directional indicia includes angular representations.

14. An egocentric display according to claim 1, further including at least one additional concentric circle, each of the at least one additional concentric circle representing an angular elevation between the nadir and the zenith.

15. An egocentric display according to claim 1, wherein the ego center represents a location of interest.

16. An egocentric display according to claim 1, wherein the egocentric display is generated using instructions residing on a non-transitory computer readable medium.

17. An egocentric display according to claim 1, wherein the display is warped.

18. An egocentric display according to claim 1, wherein the zenith and the nadir are reversed.

19. A method for plotting a point locatable in a multidimensional frame of reference on the egocentric display of claim 1, the multidimensional frame of reference including an ego center, a nadir below the ego center, and a zenith above the ego center, the method comprising:
    a) determining a point ray that starts at the ego center and extends through the point;
    b) determining a zenith-nadir line that passes through the zenith, the ego center, and the nadir;
    c) determining a reference ray that starts at the ego center and extends in a horizon plane, the horizon plane being perpendicular to the zenith-nadir line;
    d) determining a point projection, the point projection being a projection of the point ray onto the horizon plane;
    e) determining a first angle from the reference ray to the point projection;
    f) determining a second angle from the point projection to the point ray;
    g) presenting an egocentric graph on the display, the egocentric graph including:
        i) a center point, the center point representing the nadir;
        ii) an inner concentric circle centered about the center point, the inner concentric circle representing the horizon plane; and
        iii) an outer concentric circle centered about the center point, the outer concentric circle having a radius larger that the inner concentric circle, the outer concentric circle representing the zenith; and h) determining a plotting position on the egocentric graph by:
  i) starting at the reference ray, traveling around the inner concentric circle by a distance specified by the first angle; and
  ii) traveling from the inner concentric circle a distance proportional to the second angle; and i) plotting the point on the egocentric graph at the plotting position.

20. The method according to claim 19, wherein:
a) the point has a value; and
b) the action of plotting the point on the egocentric graph at the plotting position includes plotting a value representation of the value on the egocentric graph at the plotting position.

21. A method according to claim 20, wherein the value describes information collected in the region of the point ray.

22. The method according to claim 20, wherein the value representation includes at least one of the following:
a) grid points;
b) intensity;
c) icons;
d) temporal changes;
e) colors;
f) numbers;
g) shading;
h) dots; or
i) any combination of two or more thereof.

23. A method according to claim 19, wherein the value represents a distance from the ego.

* * * * *